United States Patent
Widener et al.

(10) Patent No.: US 6,769,393 B2
(45) Date of Patent: Aug. 3, 2004

(54) VALVE SYSTEM FOR INTERNAL COMBUSTION ENGINE

(75) Inventors: Stanley Kevin Widener, Greenville, SC (US); David Pratt Branyon, San Antonio, TX (US); Barry Edward Westmoreland, San Antonio, TX (US)

(73) Assignee: Caterpillar Inc, Peoria, IL (US)

( * ) Notice: Subject to any disclaimer, the term of this patent is extended or adjusted under 35 U.S.C. 154(b) by 39 days.

(21) Appl. No.: 10/299,088

(22) Filed: Nov. 19, 2002

(65) Prior Publication Data

US 2004/0094117 A1 May 20, 2004

(51) Int. Cl.$^7$ ............................. F02M 25/07; F02B 29/08
(52) U.S. Cl. ................... 123/316; 123/432; 123/568.13
(58) Field of Search ............... 123/79 A, 58.8, 123/316, 568.11, 568.12, 568.13, 568.14, 585, 661, 308, 432, 279, 281; 60/285, 286, 289, 605.2

(56) References Cited

U.S. PATENT DOCUMENTS

| | | | |
|---|---|---|---|
| 2,817,322 A | 12/1957 | Miller | 123/316 |
| 3,057,336 A | 10/1962 | Hatz, Jr. | 123/90.16 |
| 3,071,123 A * | 1/1963 | Gromme | 123/661 |
| 4,250,850 A * | 2/1981 | Ruyer | 123/58.8 |
| 4,546,751 A * | 10/1985 | Jarnuszkiewicz et al. | 123/568.13 |
| 4,674,450 A * | 6/1987 | Krajancich | 123/316 |
| 4,958,606 A | 9/1990 | Hitomi et al. | 123/316 |
| 5,203,310 A * | 4/1993 | Gatellier | 123/568.13 |
| 5,228,422 A | 7/1993 | Wakeman | 123/432 |
| 5,351,668 A * | 10/1994 | Gatellier | 123/568.13 |
| 5,682,854 A | 11/1997 | Ozawa | 123/316 |
| 5,732,677 A | 3/1998 | Baca | 123/316 |
| 5,782,226 A * | 7/1998 | Gartner | 123/568.13 |
| 5,862,790 A | 1/1999 | Dai et al. | 123/316 |
| 6,135,086 A | 10/2000 | Clarke et al. | 123/316 |
| 6,425,381 B1 * | 7/2002 | Rammer | 123/58.8 |
| 2003/0136387 A1 * | 7/2003 | Arnell | 123/568.13 |

* cited by examiner

Primary Examiner—Willis R. Wolfe
(74) Attorney, Agent, or Firm—Finnegan, Henderson, Farabow, Garrett & Dunner

(57) ABSTRACT

A valve system for an engine is provided. The valve system includes a cylinder head that defines an intake passageway, an exhaust passageway, and an auxiliary passageway. The auxiliary passageway includes a first connection with the intake passageway and a second connection with the exhaust passageway. A control valve is disposed in the auxiliary passageway. The control valve is moveable between a first position where the control valve blocks the first connection between the auxiliary passageway and the intake passageway and a second position where control valve blocks the second connection between the auxiliary passageway and the exhaust passageway.

22 Claims, 2 Drawing Sheets

VALVE SYSTEM FOR INTERNAL COMBUSTION ENGINE

TECHNICAL FIELD

The present invention is directed to a valve system for an internal combustion engine. More particularly, the present invention is directed to a valve system that can be modified during engine operation to improve engine performance.

BACKGROUND

An internal combustion engine typically includes a series of valves that may be actuated to control the intake and exhaust of gases that flow to and from the combustion chambers of the engine. A typical engine will include at least one intake valve and at least one exhaust valve for each combustion chamber in the engine. The opening of each of the valves is timed to occur at a certain point in the operating cycle of the engine. For example, an intake valve is typically opened when a piston is withdrawing in its cylinder to allow fresh air to enter the combustion chamber. An exhaust valve is typically opened after combustion and when the piston is advancing within the cylinder to expel the exhaust gas from the combustion chamber.

The actuation, or opening and closing, of the engine valves may be controlled in a number of ways. For example, each engine valve may be driven by a cam that is operatively connected to the engine crankshaft. The rotation of the engine crankshaft causes a corresponding rotation of each cam, which, in turn, actuates the corresponding engine valve. Because the rotation of the crankshaft also controls the motion of the piston, this type of arrangement may be used to coordinate the actuation of each engine valve with the desired portion of the engine operating cycle.

Recent research into engine operation has revealed that modifying the timing of the valve actuation based on the operating conditions of the engine may improve the efficiency of the engine and/or reduce the emissions generated by the engine. For example, an engine may be operated on a Miller cycle to reduce the emissions generated by the engine. In a Miller cycle, the actuation of the intake valves is modified so that the intake valves either remain closed for a portion of the intake stroke or remain open for a portion of the compression stroke. This has been found to reduce the generation of emissions. However, the benefits of the Miller cycle are typically achieved when the engine is operating under steady loads. An engine that operates solely on the Miller cycle may be difficult to start.

Accordingly, to take full advantage of the Miller cycle, and other such valve actuation modifications, an engine requires a valve timing system that may be modified to adjust the valve timing based on the operating conditions of the engine. One example of an engine that includes a variable valve timing system is described in U.S. Pat. No. 5,682,854. In this engine, a cam driven valve system is supplemented with an additional cam that may be rotated by an actuator that is independent of the engine crankshaft. Rotation of the additional cam will change the phase of the cams that actuate one intake valve and one exhaust valve. Changing the phase of the cams will modify the timing of the valve actuation. Thus, this system may be used to modify the timing of the valve actuation during engine operation.

However, adding the additional cam to the valve system increases the complexity of the valve system. The increased complexity may result in an increased cost of the engine. In addition, the additional parts may require more maintenance and may be more susceptible to failure. Accordingly, such an engine may experience undesirable down time due to maintenance and/or repair of the valve system.

The valve system of the present invention solves one or more of the problems set forth above.

SUMMARY OF THE INVENTION

One aspect of the present invention is directed to a valve system for an engine. A cylinder head defines an intake passageway, an exhaust passageway, and an auxiliary passageway. The auxiliary passageway includes a first connection with the intake passageway and a second connection with the exhaust passageway. A control valve is disposed in the auxiliary passageway. The control valve is moveable between a first position where the control valve blocks the first connection between the auxiliary passageway and the intake passageway and a second position where the control valve blocks the second connection between the auxiliary passageway and the exhaust passageway.

In another aspect, the present invention is directed to an engine that includes an engine block defining at least one combustion chamber. A cylinder head is configured to engage the engine block. The cylinder head defines an intake passageway that leads to the combustion chamber, at least one exhaust passageway that leads from the combustion chamber, and an auxiliary passageway that leads from the combustion chamber. An auxiliary valve element is disposed in the auxiliary passageway for movement between an open position and a closed position. A piston is disposed in the combustion chamber for movement between a bottom dead center position and a top dead center position. The piston has a combustion bowl configured to receive the auxiliary valve element when the piston is at the top dead center position and the auxiliary valve element is in the open position.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
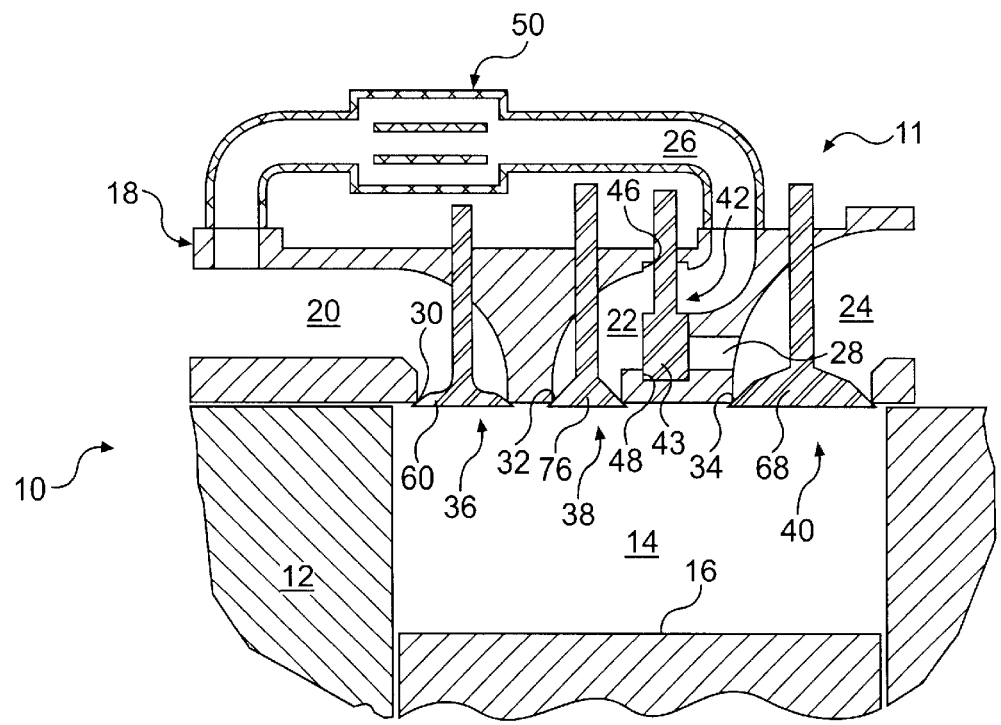
FIG. 1 is a cross-sectional diagrammatic view of an engine having a valve system according to an exemplary embodiment of the present invention.

FIG. 1 illustrates an embodiment of an engine 10 having a valve system 11 in accordance with an exemplary embodiment of the present invention. Engine 10 may be any type of internal combustion engine. For example, engine 10 may be a diesel engine, a gasoline engine, or a natural gas engine.

Engine 10 includes an engine block 12 that defines a series of combustion chambers 14 (only one of which is illustrated in FIG. 1). A piston 16 is slidably disposed within each combustion chamber 14. Piston 16 is driven by a crankshaft (not shown) to reciprocally move between a bottom dead center position and a top dead center position.

A cylinder head 18 is engaged with engine block 12. Cylinder head 18 defines a series of passageways that lead to and from each combustion chamber 14. In the exemplary embodiment illustrated in FIG. 1, cylinder head 18 defines an intake passageway 20 and an exhaust passageway 24. Intake passageway 20 directs air from an intake manifold (not shown) to combustion chamber 14. Exhaust passageway 24 conducts combustion exhaust to an exhaust manifold (not shown).

Figure 2:
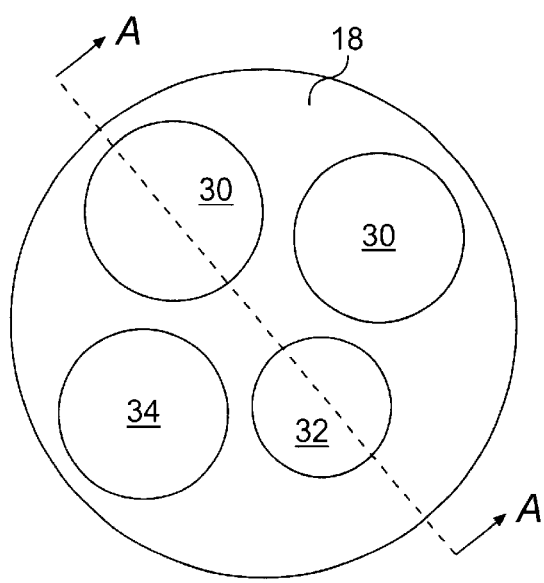
FIG. 2 is a bottom view of a cylinder head having a valve arrangement according to an exemplary embodiment of the present invention.

As illustrated in FIG. 2, cylinder head 18 may include a pair of intake openings 30. Referring to FIGS. 1 and 2, intake passageway 20 directs intake gas, which may be, for example, fresh air or recirculated engine exhaust, from the intake manifold through each of the pair of intake openings 30 and into combustion chamber 14. Alternative configurations of the intake passageway may be readily apparent to one skilled in the art. For example, cylinder head 18 may define a separate passageway from the intake manifold to each of the pair of intake openings 30.

Figure 3:
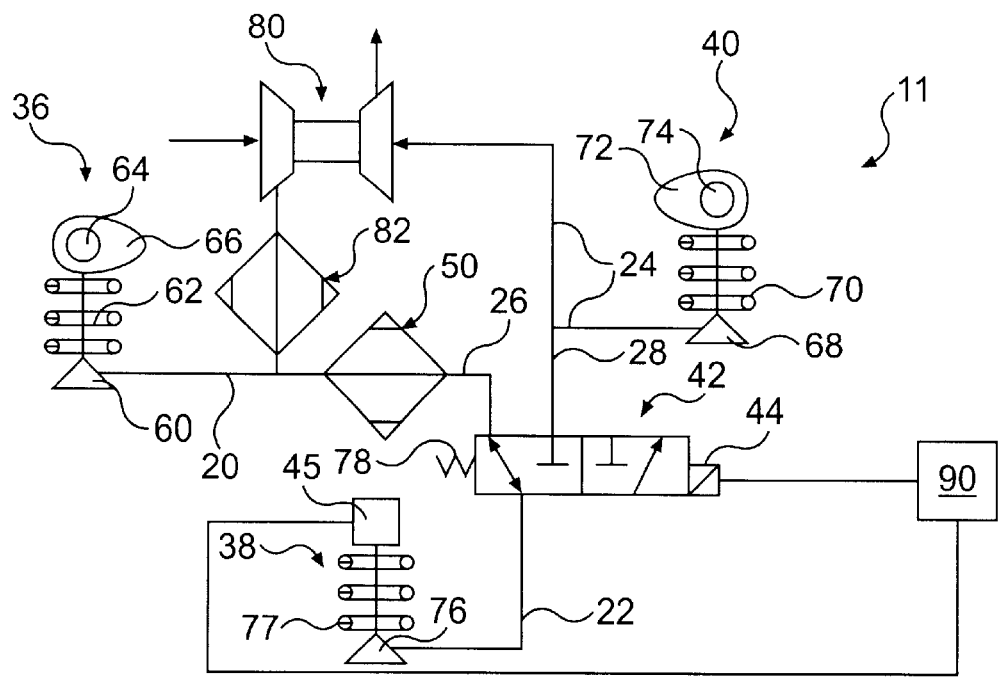
FIG. 3 is a schematic view of a valve system according to an exemplary embodiment of the present invention.

As shown in FIG. 1, an intake valve 36 may be disposed in cylinder head 18. Intake valve 36 includes a valve element 60 that is configured to engage intake opening 30. One such intake valve 36 may be disposed in each of the pair of intake openings 30 (referring to FIG. 2). Intake valve 36 may be moved between a closed position where valve element 60 engages intake opening 30 to block intake opening 30 and an open position where air may flow from intake passageway 20 through intake opening 30 into combustion chamber 14. As shown in FIG. 3, a spring 62 is engaged with intake valve 36. Spring 62 may be configured to act on intake valve 36 to bias valve element 60 into the closed position.

Intake valve 36 may be actuated in any manner readily apparent to one skilled in the art. For example, as illustrated in FIG. 3, intake valve 36 may be driven by an intake cam 66 that is securely fixed to a shaft 64. Shaft 64 may be operatively connected with the engine crankshaft (not shown) through a timing gear arrangement. Alternatively, intake valve 36 may be driven by a cam and cam follower arrangement (not shown). In addition, intake valve 36 may be actuated independently of the engine crankshaft rotation through, for example, a hydraulic or solenoid actuator (not shown).

As also illustrated in FIG. 2, cylinder head 18 includes an exhaust opening 34. As shown in FIG. 1, exhaust opening 34 connects combustion chamber 14 with exhaust passageway 24. Exhaust gas may exit combustion chamber 14 through exhaust opening 34 and follow exhaust passageway 24 to the exhaust manifold.

As shown in FIG. 1, an exhaust valve 40 may be disposed in cylinder head 18. Exhaust valve 40 includes a valve element 68 that is configured to engage exhaust opening 34. Exhaust valve 40 may be moved between a closed position where valve element 68 engages exhaust opening 34 to block exhaust opening 34 and an open position where gas may flow from combustion chamber 14 through exhaust opening 34 and into exhaust passageway 24. As shown in FIG. 3, a spring 70 is engaged with exhaust valve 40. Spring 70 may act on exhaust valve 40 to bias valve element 68 into the closed position.

Exhaust valve 40 may be actuated in any manner readily apparent to one skilled in the art. For example, as illustrated in FIG. 3, exhaust valve 40 may be driven by an exhaust cam 72 that is securely fixed to a shaft 74. Shaft 74 may be operatively connected with the engine crankshaft (not shown) through a timing gear arrangement. Alternatively, exhaust valve 40 may be driven by a cam and cam follower arrangement (not shown). In addition, exhaust valve 40 may be actuated independently of the engine crankshaft rotation through, for example, a hydraulic or solenoid actuator (not shown).

As also shown in FIG. 1, cylinder head 18 defines an auxiliary passageway 22. Auxiliary passageway 22 includes an auxiliary opening 32 that leads to combustion chamber 14. An auxiliary valve 38 is disposed in cylinder head 18 and includes a valve element 76 that is configured to block auxiliary opening 32. Auxiliary valve 38 may be moved between a closed position where valve element 76 blocks auxiliary opening 32 and an open position where gas may flow between combustion chamber 14 and auxiliary passageway 22.

As shown in FIG. 3, a valve actuator 45 is operatively connected to auxiliary valve 38. Valve actuator 45 is operable to move valve element 76 from the closed position to the open position.! Valve actuator 45 may be any type of valve actuation device readily apparent to one skilled in the art, such as, for example, a solenoid-driven actuator or a hydraulically-driven actuator. For the purposes of this invention, the timing of auxiliary valve 38 should be variable with respect to the timing of motion of piston 16. A spring 77 may be engaged with auxiliary valve 38. Spring 77 may act on auxiliary valve 38 to bias valve element 76 into the closed position.

Figure 4:
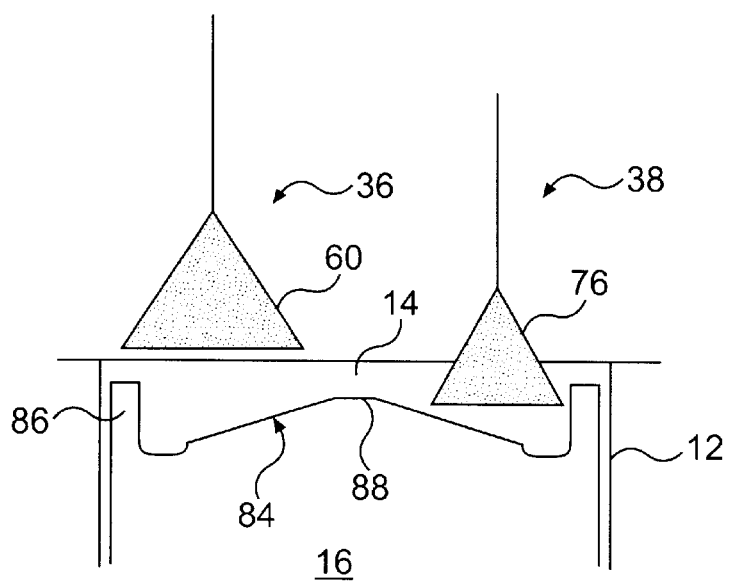
FIG. 4 is a diagrammatic sectional view of an engine cylinder and valve system according to an exemplary embodiment of the present invention.

Valve element 76 of auxiliary valve 38 and piston 16 may be configured so that piston 16 will not contact valve element 76 when piston 16 is in a top dead center position. As shown in FIG. 4, piston 16 may include a combustion bowl 84. Combustion bowl 84 may be configured to improve the efficiency of the combustion portion of the engine operating cycle. Combustion bowl 84 may be defined by a wall 86 that encompasses the outer circumference of piston 16. Combustion bowl 84 may also include a central projection 88. Various alternative configurations of combustion bowl 84 may be readily apparent to one skilled in the art.

Combustion bowl 84 and valve element 76 of auxiliary valve 38 may be configured so that combustion bowl 84 will receive valve element 76. For the purposes of the present disclosure, the term "receive" is intended to include those configurations of combustion bowl 84 and valve element 76 where valve element 76 will not contact piston 16 when piston 16 is in the top dead center position and auxiliary valve 38 is in the open position. In the exemplary embodiment illustrated in FIG. 4, valve element 76 of auxiliary valve 38 is received between central projection 88 and wall 86. Various alternative configurations may be readily apparent to one skilled in the art.

As further illustrated in FIG. 1, auxiliary passageway 22 is connected to intake passageway 20 through a first connection 26 and is connected to exhaust passageway 24 through a second connection 28. A control valve 42 is configured to selectively connect auxiliary passageway 22 with one of first connection 26 and second connection 28. Control valve 42 includes a valve element 43 that may be moved between a first position, where valve element 43 engages a first valve seat 46 and blocks first connection 26, and a second position, where valve element 43 engages a second valve seat 48 and blocks second connection 28. Thus, valve element 43 of control valve 42 may be moved to connect auxiliary passageway 22 with intake passageway 20 through first passageway 26 or with exhaust passageway 24 through second connection 28. Control valve 42 may have any configuration readily apparent to one skilled in the art.

As shown in FIG. 3, control valve 42 may be represented as a two position valve. A spring 78 may bias control valve 42 into the first position, where auxiliary passageway 22 is connected with intake passageway 20. A heat exchanger 50 may be positioned between auxiliary passageway 22 and intake passageway 20. Heat exchanger 50 may be any conventional heat exchanger, such as, for example, any heat exchangers commonly used in an exhaust gas recirculation system. Heat exchanger 50 may reduce the temperature of the gases exiting combustion chamber 14 and joining intake passageway 20.

A valve actuator 44, which may be, for example, solenoid driven or hydraulically driven, is operatively connected with control valve 42. Valve actuator 44 may be activated to move the valve from the first position to the second position and connect auxiliary passageway 22 with exhaust passageway 24. Control valve 42 may be returned to the first position by de-activating valve actuator 44 to allow spring 78 to move control valve to the first position.

As also shown in FIG. 3, exhaust passageway 24 may lead to a turbocharger 80. Turbocharger 80 maybe configured to use the energy of the exhaust gas to compress or pre-charge the intake gas. The intake gas may then be passed through an aftercooler 82 before passing through intake passageway 20 and into combustion chamber 14.

A control 90 may be provided to govern the positions of auxiliary valve 38 and control valve 42. As mentioned previously, intake and exhaust valves 36 and 40 may be actuated by the rotation of the engine crankshaft. It should be understood, however, that control 90 may also be configured to control the actuation of intake and exhaust valves 36 and 40.

Control 90 may be, for example, an engine control module or other similar device. Control 90 may be connected to a series of sensors (not shown). The sensors may be configured to provide indications of the current operating conditions of engine 10 and/or the operating conditions of the application environment. For example, the sensors may provide information regarding different operating parameters, of the engine and/or vehicle, such as the engine operating speed, the engine temperature, the vehicle speed, and any other type of parameter commonly sensed during engine operation.

INDUSTRIAL APPLICABILITY

As will be apparent from the foregoing description, the disclosed valve system provides the ability to adjust the actuation timing of the valves in an engine. The disclosed valve system may be implemented into any type of internal combustion engine. The described valve system may be used with a conventional engine valve actuation system, where the valve actuation is dependent upon the rotation of the engine crankshaft. Alternatively, the valve system may be used with a full authority engine valve actuation system, where each of the engine valves are actuated independently of the rotation of the engine crankshaft.

The disclosed valve system further provides the ability to adjust the timing of valve actuation based on the operating conditions of the engine. This increased control over the timing of valve actuation may result in an increase in the efficiency of the engine. In addition, the increased control over valve actuation may be used to reduce the emissions generated by the engine. In particular, control 90 may actuate auxiliary valve 38 and control valve 42 based on the sensed operating conditions to improve the performance of the engine and/or reduce the emissions of the engine.

For example, auxiliary valve 38 and control valve 42 may be actuated to direct exhaust gas through auxiliary passageway 22 to intake passageway 20 when a first set of operating conditions are experienced. In addition, auxiliary valve 38 and control valve 42 may be actuated to direct exhaust gas through auxiliary passageway 22 to exhaust passageway 24 when a second set of operating conditions are experienced. The following scenarios present several examples of valve actuation combinations that may be desirable under different operating conditions. One skilled in the art may recognize that additional benefits may be achieved by actuating the valve system of the present invention to selectively direct the exhaust gas to either the intake or exhaust passageways under different sets of operating conditions.

In one example, auxiliary valve 38 and control valve 42 may be actuated to assist in the recirculation of exhaust gas to reduce engine emissions when the engine is operating under a steady load. This may be accomplished by moving control valve 42 to the second position and opening auxiliary valve 38 for a short duration prior to the normal opening of exhaust valve 40. This actuation will capture the high pressure portion of the exhaust stroke and direct the high pressure exhaust gas to intake passageway 20. The high pressure of the exhaust gas will help provide the force required to recirculate the exhaust gas. Accordingly, there may not be a need to backpressure the engine or otherwise pump the exhaust gas into the intake passageway.

In another example, value system 11 may be used to help improve the effectiveness of engine 10 in a braking situation, where an operator has requested that the vehicle slow down. Under these circumstances, the fuel injection system may be temporarily disabled so that no fuel is injected into combustion chamber 14. Control valve 42 may be moved to the first position and auxiliary valve 38 may be actuated when piston 16 is near the top dead center position of the compression stroke. This configuration will direct the gas compressed by piston 16 to exhaust passageway 24 instead of initiating combustion. Thus, the work performed in compressing the air will be exhausted to the environment instead of recovered during the expansion stroke. In this manner, valve system 11 may help to slow the vehicle. This may result in an improvement in the braking performance of the engine, as well as a reduction in the wear on the braking system.

Valve system 11 may also be used to implement a Miller cycle. A late-intake type Miller cycle may be achieved by moving control valve 42 to the second position and opening auxiliary valve 38 at the end of the intake stroke and for the first portion of the compression stroke. This may reduce the effective compression ratio in the combustion chamber and may improve the efficiency of the engine, as well as reduce the emissions of the engine.

A Miller cycle type approach may also be applied in a high compression ratio engine. The high compression ratio may aid the cold starting capabilities of the engine. Continued use of a high compression ratio, may, however, decrease the efficiency of the engine or result in excessive maximum cylinder pressure after the engine is started or at certain operating conditions. Accordingly, valve system 11 may be used to reduce the effective compression ratio of the engine when the engine is running.

Valve system 11 may also be used to achieve various enhancements in the timing of valve actuation. For example, auxiliary valve 38 and control valve 42 may be used to augment the normal intake stroke by moving control valve 42 to the second position and opening the auxiliary valve 38 at either end of the normal intake stroke. This will effectively lengthen the intake stroke and increase the amount of time combustion chamber 14 is open to intake passageway 20. Similarly, auxiliary valve 38 and control valve 42 may be used to augment the normal exhaust stroke by moving control valve 42 to the first position and opening the auxiliary valve 38 at either end of the normal exhaust stroke. This will effectively lengthen the exhaust stroke and increase the amount of time combustion chamber 14 is open to exhaust passageway 24. The augmentation of the intake stroke and/or the exhaust stroke may be initiated based on the sensed operating conditions to optimize the performance of engine 10.

Valve system 11 may further be used to provide a rapid acceleration of turbocharger 80. This may be accomplished by moving control valve 42 to the first position and opening auxiliary valve 38 slightly before exhaust valve 40 is opened during the normal exhaust stroke. Exhaust gas will be directed from combustion chamber 14 through exhaust passageway 24 to turbocharger 80. This exhaust gas may provide a boost to turbocharger 80 and may increase the amount of intake gas available to combustion chamber 14, when engine 10 is experiencing up-load transients.

Valve system 11 may also be used to improve idle control over engine 10. For example, under idling conditions, auxiliary valve 38 may be opened continuously with control valve 42 in either the first or the second position. In this configuration, the air or gas in the combustion chamber 14 will be forced out of the combustion chamber 14 during the compression stroke of piston 16 and will not be compressed. In addition, fuel injections to the particular combustion chamber 14 may be ceased. In this manner, combustion may be prevented in the particular combustion chamber 14. Thus, fuel consumption and power generation may be decreased when the engine is idling.

Valve system 11 may also be used to help cool piston 16 under high engine load conditions. This may be accomplished by moving control valve 42 to either the first position or the second position and actuating auxiliary valve 38 during the valve overlap period. In this manner, additional scavenging flow may be introduced to combustion chamber 14 to enhance cooling of piston 16.

It will be apparent to those skilled in the art that various modifications and variations can be made in the valve system of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A valve system for an engine, comprising:
   a cylinder head defining an intake passageway, an exhaust passageway, and an auxiliary passageway having a first connection with the intake passageway and a second connection with the exhaust passageway; and
   a control valve disposed in the auxiliary passageway and moveable between a first position where the control valve blocks the first connection between the auxiliary passageway and the intake passageway and a second position where the control valve blocks the second connection between the auxiliary passageway and the exhaust passageway.

2. The valve system of claim 1, wherein the control valve is hydraulically actuated.

3. The valve system of claim 1, wherein the control valve is actuated by a solenoid.

4. The valve system of claim 1, further including at least one intake valve disposed in the intake passageway, at least one exhaust valve disposed in the exhaust passageway, and an auxiliary valve disposed in the auxiliary passageway.

5. The valve system of claim 4, wherein the cylinder head defines at least one intake opening, an exhaust opening, and an auxiliary opening, and the at least one intake valve is configured to selectively block the at least one intake opening, the exhaust valve is configured to selectively block the exhaust opening, and the auxiliary valve is configured to selectively block the auxiliary opening.

6. An engine, comprising:
   an engine block defining at least one combustion chamber;
   a cylinder head configured for engagement with the engine block, the cylinder head defining an intake passageway leading to the combustion chamber, at least one exhaust passageway leading from the combustion chamber, and an auxiliary passageway leading from the combustion chamber;
   an auxiliary valve element disposed in the auxiliary passageway for movement between an open position and a closed position; and
   a piston disposed in the combustion chamber for movement between a bottom dead center position and a top dead center position, the piston having a combustion bowl configured to, receive the auxiliary valve element when the piston is at the top dead center position and the auxiliary valve element is in the open position.

7. The engine of claim 6, wherein the piston includes a wall surrounding the combustion bowl and a central projection and the piston receives the auxiliary valve element between the central projection and the wall.

8. The engine of claim 6, further including at least one intake valve configured to selectively block the intake passageway and an exhaust valve configured to selectively block the exhaust passageway.

9. The engine of claim 8, wherein at least the one intake valve is driven by an intake cam, the exhaust valve is driven by an exhaust cam, and the auxiliary valve is hydraulically driven.

10. An engine, comprising:
    an engine block defining at least one combustion chamber having a piston slidably disposed therein;
    a cylinder head configured for engagement with the engine block, the cylinder head defining an intake passageway leading to the at least one combustion chamber, an exhaust passageway leading from the at least one combustion chamber, and an auxiliary passageway having a first connection with the intake passageway and a second connection with the exhaust passageway; and
    a control valve disposed in the auxiliary passageway and moveable between a first position where the valve blocks the first connection between the auxiliary passageway and the intake passageway and a second position where valve blocks the second connection between the auxiliary passageway and the exhaust passageway.

11. The engine of claim 10, further including at least one intake valve configured to selectively block the intake passageway, an exhaust valve configured to selectively block the exhaust passageway, and an auxiliary valve configured to selectively block the auxiliary passageway.

12. The engine of claim 11, wherein the at least one intake valve is driven by an intake cam, the exhaust valve is driven by an exhaust cam, and the auxiliary valve is hydraulically driven.

13. The engine of claim 10, further including a heat exchanger disposed in the first connection between the auxiliary passageway and the intake passageway.

14. The engine of claim 13, further including a turbocharger operable to provide pressurized air to the intake passageway.

15. The engine of claim 14, further including an aftercooler disposed between the turbocharger and the intake passageway.

16. A method of controlling air flow in an engine, comprising:
  actuating an intake valve to selectively connect an intake passageway with a combustion chamber in the engine;
  actuating an exhaust valve to selectively connect the combustion chamber with an exhaust passageway;
  actuating an auxiliary valve to selectively connect the combustion chamber with an auxiliary passageway;
  connecting the auxiliary passageway with the intake passageway when the engine experiences a first set of operating conditions; and
  connecting the auxiliary passageway with the exhaust passageway when the engine experiences a second set of operating conditions.

17. The method of claim 16, wherein the auxiliary valve is actuated and the auxiliary passageway is connected with the intake passageway during a portion of an intake stroke of a piston.

18. The method of claim 16, wherein the auxiliary valve is actuated and the auxiliary passageway is connected with the intake passageway prior to the actuation of the exhaust valve during an exhaust stroke of a piston.

19. The method of claim 16, wherein the auxiliary valve is actuated and the auxiliary passageway is connected with the exhaust passageway when a piston approaches a top dead center position of a compression stroke.

20. The method of claim 16, wherein the auxiliary valve is actuated and the auxiliary passageway is connected with one of the exhaust passageway and the intake passageway during an intake stroke of a piston and a compression stroke of a piston.

21. The method of claim 16, wherein the auxiliary valve is actuated and the auxiliary passageway is connected with the intake passageway during a valve overlap period.

22. The method of claim 16, wherein the auxiliary valve is actuated and the auxiliary passageway is connected with the exhaust passageway prior to the actuation of the exhaust valve during an exhaust stroke of a piston.

* * * * *